United States Patent
Izenberg et al.

(10) Patent No.: US 12,321,301 B1
(45) Date of Patent: Jun. 3, 2025

(54) LOW-LATENCY PACKET PROCESSING FOR NETWORK DEVICE

(71) Applicant: Amazon Technologies, Inc., Seattle, WA (US)

(72) Inventors: Erez Izenberg, Tel Aviv (IL); Said Bshara, Tira (IL); Jonathan Cohen, Hod Hasharon (IL); Avigdor Segal, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/891,200

(22) Filed: Aug. 19, 2022

Related U.S. Application Data

(63) Continuation of application No. 17/203,231, filed on Mar. 16, 2021, now Pat. No. 11,467,998.

(51) Int. Cl.
| | |
|---|---|
| *G06F 13/42* | (2006.01) |
| *G06F 9/46* | (2006.01) |
| *G06F 13/28* | (2006.01) |
| *G06F 15/173* | (2006.01) |
| *G06F 15/78* | (2006.01) |

(52) U.S. Cl.
CPC .......... *G06F 13/4221* (2013.01); *G06F 9/466* (2013.01); *G06F 13/28* (2013.01); *G06F 15/173* (2013.01); *G06F 15/7807* (2013.01)

(58) Field of Classification Search
CPC ...... G06F 13/4221; G06F 9/466; G06F 13/28; G06F 15/173; G06F 15/7807
USPC .......................................................... 710/313
See application file for complete search history.

(56) References Cited

U.S. PATENT DOCUMENTS

| | | | |
|---|---|---|---|
| 7,913,194 B1 | 3/2011 | Baylor | |
| 9,684,615 B1* | 6/2017 | Nguyen | G06F 13/30 |
| 9,916,269 B1 | 3/2018 | Machulsky et al. | |
| 9,952,991 B1* | 4/2018 | Bruce | G06F 5/12 |
| 2007/0185941 A1* | 8/2007 | Matsui | H04N 21/2362 |
| 2010/0169550 A1* | 7/2010 | Akita | G06F 12/0868 |
| | | | 711/E12.008 |
| 2016/0283415 A1 | 9/2016 | McBride et al. | |
| 2017/0019850 A1* | 1/2017 | Ahmed | H04L 12/56 |
| 2020/0293353 A1* | 9/2020 | Yamaura | G06F 9/52 |
| 2021/0141730 A1 | 5/2021 | Chinchole | |

OTHER PUBLICATIONS

U.S. Appl. No. 17,203,231, U.S. Patent Application, "Low-Latency Packet Processing for Network Device" filed Mar. 16, 2021.
U.S. Appl. No. 17/203,231, "Notice of Allowance", mailed May 27, 2022, 9 pages.

* cited by examiner

*Primary Examiner* — Chun Kuan Lee
(74) *Attorney, Agent, or Firm* — Kilpatrick Townsend & Stockton LLP

(57) ABSTRACT

Techniques for low-latency packet processing are disclosed. A network device receives a first set of write transactions including a first set of data segments corresponding to a first DMA descriptor from a host. The network device receives a second set of write transactions including a second set of data segments corresponding to a second DMA descriptor from the host. The network device detects that the first set of data segments have been written. In response to detecting that the first set of data segments have been written, and prior to completely writing the second set of data segments and to receiving a packet notifier from the host, the network device processes the first DMA descriptor.

20 Claims, 10 Drawing Sheets

LOW-LATENCY PACKET PROCESSING FOR NETWORK DEVICE

CROSS-REFERENCE TO RELATED APPLICATION

This application claims priority to and is a continuation of U.S. patent application Ser. No. 17/203,231, filed Mar. 16, 2021, and entitled "LOW-LATENCY PACKET PROCESSING FOR NETWORK DEVICE," the content of which is hereby incorporated by reference in its entirety for all purposes.

BACKGROUND

Computing systems may include peripheral devices. Peripheral devices may add to or change the functionality of the computing system. In many cases, peripheral devices are connected to the computing system using an interconnect. The interconnect may implement a standard bus protocol, such as any of the Peripheral Component Interconnect (PCI) family of bus protocols.

Some computing systems are networked. These computing systems may include a host processor, host memory, and a network interface device to send and receive packets. It is common for the network device to be in the form of a network interface card (NIC) that is interconnected with the host processor by way of a bus. The host processor may send the packets to the NIC for transmission onto a network.

BRIEF DESCRIPTION OF THE DRAWINGS

Various embodiments in accordance with the present disclosure will be described with reference to the drawings, in which.

DETAILED DESCRIPTION

Figure 1:
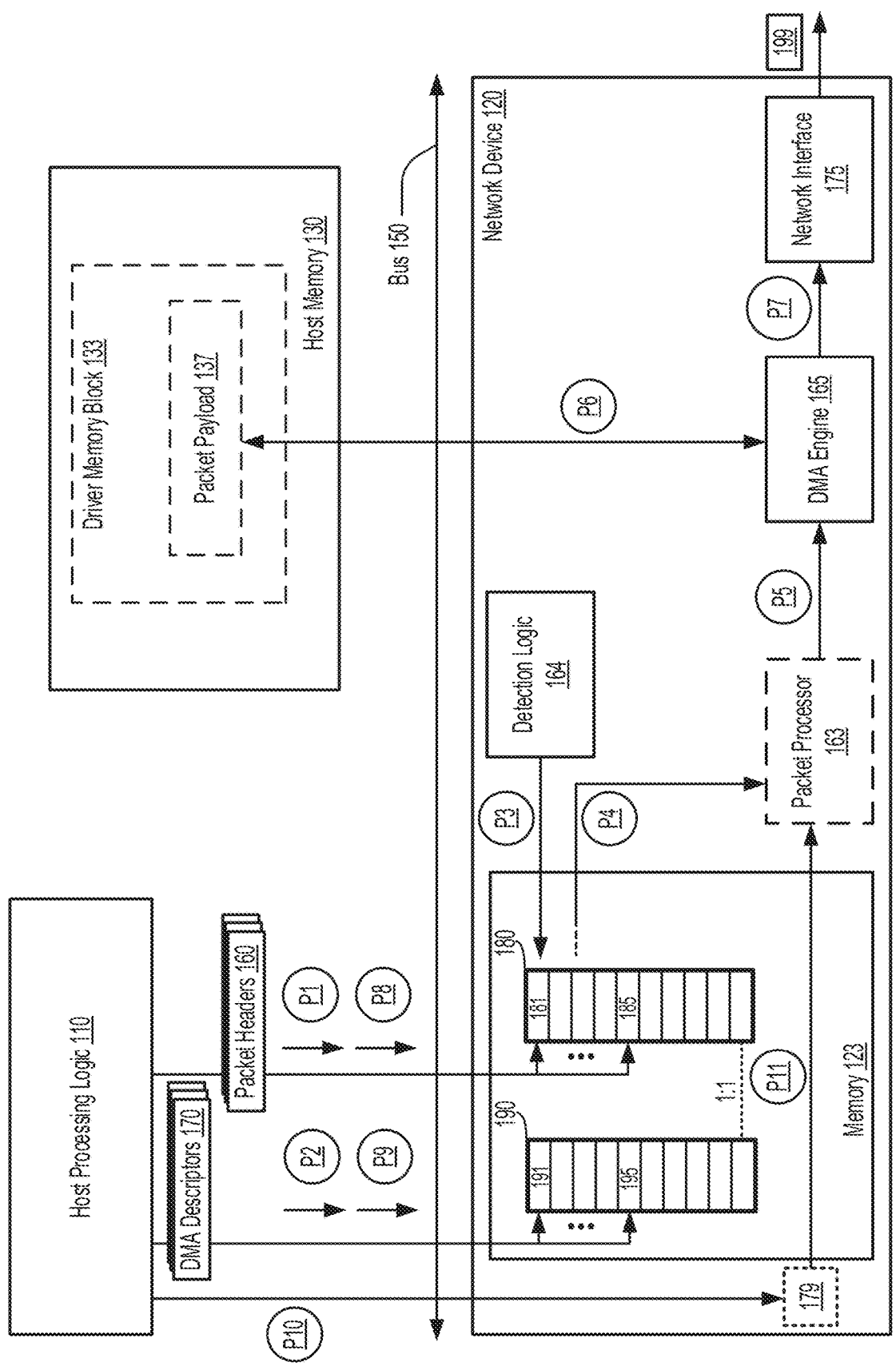
FIG. 1 illustrates a hybrid block diagram flow showing an example process of delivering a packet from a host processing logic to a network device.

Certain computing systems can include a host processor, a host memory, and a network device, which are each interconnected by a bus, such as a Peripheral Component Interconnect-based (PCI-based) bus. Such computing systems may transmit network packets (or simply "packets") over a network to a point of destination using the network device. Before a packet can be sent, the packet is first assembled, brought onto the network device, and prepared for transmission via a network interface at the network device. These steps, which may be collectively referred to as "packet processing", can be computationally intensive. As such, it can be desirable to offload much of the packet processing from the host processor onto the network device, which may include dedicated hardware and processing logic for performing many of these tasks.

In some instances, the latency of the packet processing can be improved by reducing the number of transactions on the PCI-based bus that are ordinarily used to deliver a packet to a network device. This is accomplished by maintaining a packet header queue and a packet descriptor queue in the memory of the network device. The host processor writes packet headers to the packet header queue and direct memory access (DMA) descriptors to the packet descriptor queue. A DMA descriptor points to a packet payload memory location in the host memory that stores a packet payload associated with the packet header. The network device fetches the packet payload using the DMA descriptor. The packet header and the packet payload can then be transmitted by the network device onto a network as a packet. The packet header queue and the packet descriptor being on-board the network device can help in reducing the bus traffic by reducing the number of DMA reads the network device reads from the host memory, for example.

The number of transactions on the bus is further reduced by reducing the number of notifications that are sent from the host processor to the network device. Such notifications can alert the network device that the host processor has finished writing multiple packet headers and DMA descriptors to the corresponding queues. A notification can include the host processor writing to a doorbell register in the memory of the network device. In some instances, a single notification can be sent after every 8, 16, or 32 (or more) packet headers and DMA descriptors are written. However, by reducing the number of sent notifications, the latency associated with processing the packet headers and DMA descriptors may be increased, since the network device may not begin the packet processing until the notification arrives. As such, new systems, devices, methods, and other techniques for reducing packet processing latency are needed.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems, devices, and methods of the present disclosure provide for low-latency packet processing without needing to wait for a notification (or "doorbell") to arrive from the host processor to begin processing the packet header and/or the DMA descriptor. This can be accomplished using detection logic implemented at the network device that detects that data has been written to entries in the packet header queue and/or packet descriptor queue. Upon detecting that the data has been written, the network device may begin processing the packet header and/or the DMA descriptor prior to the notification arriving from the host processor. As such, for cases in which a notification is only sent after every N packet headers and DMA descriptors are written (where N>1), the network device can begin processing a first packet immediately after a first packet header and a first DMA descriptor are written, providing a significant improvement in packet processing latency.

Some embodiments of the present disclosure provide for systems, devices, and methods for delivering one or more packets to a network device. In a particular implementation, a computing system may include a host processor, a host memory, and a network device, which are interconnected by a bus. The network device can receive, via a bus interface, a first set of write transactions from the host processor. The first set of write transactions can respectively include a first set of data segments corresponding to a first DMA descriptor, the first DMA descriptor pointing to a first packet payload memory location in a host memory. The first set of data segments can be written to a first entry of a packet descriptor queue.

The network device can also receive, via the bus interface, a second set of write transactions from the host. The second set of write transactions can respectively include a second set of data segments corresponding to a second DMA descriptor. The second set of data segments can be written to a second entry of the packet descriptor queue. Prior to completion of writing the second set of data segments, it can be detected that the first set of data segments have been written, and in response to detecting that the first set of data segments have been written, the first DMA descriptor can be processed.

FIG. 1 illustrates a hybrid block diagram flow showing an example process of delivering a packet from a host processing logic 110 to a network device 120 for transmitting the packet onto a network. FIG. 1 includes the host processing logic 110, a network device 120, and a host memory 130, which are interconnected by a bus 150. In one embodiment, a "host" includes the host processing logic 110 and the host memory 130. Although FIG. 1 includes blocks to represent particular hardware, the electrical connections illustrated in FIG. 1 are not necessarily complete, as FIG. 1 is presented to show the flow of a process that includes the illustrated hardware components.

The host processing logic 110 may include one or more processors, microprocessors, integrated circuits, field-programmable gate arrays (FPGAs) or other suitable processing logic. The processors may be general purpose computing devices such as are manufactured by Intel®, AMD®, ARM®, Qualcomm®, and others. The processors are generally capable of executing software code. A processor may include multiple processing cores.

The host memory 130 may provide temporary or long-term storage for data that may be accessed by the host processing logic 110. The host memory 130 may include Dynamic Random Access Memory (DRAM), Synchronous DRAM (SDRAM), and/or Double Data Rate (DDR), among others. In some cases, the host memory 130 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others.

The bus 150 in FIG. 1 may be any suitable bus for writing data from the host processing logic 110 to the network device 120. The bus 150 is also used by the network device 120 for accessing and storing data in the host memory 130, as will be described in more detail below. The bus 150 implements one or more variations of the Peripheral Component Interconnect (PCI) standard bus protocols, in some embodiments. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols.

Other bus protocols can be used for the bus 150, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

In one example, the host processing logic 110 may need to transmit packets onto a network using the network device 120. The network device 120 may be a Network Interface Controller (NIC) that includes a network interface 175 connected to the network. At process block P1 in FIG. 1, the host processing logic 110 begins to write packet headers 160 to a packet header queue 180 of network device 120 over bus 150. Each of the packet headers 160 may include control information (e.g., source and destination network addresses, error detection codes, etc.) and/or other information for the corresponding packet. At process block P2, the host processing logic 110 begins to write DMA descriptors 170 to a packet descriptor queue 190 of network device 120 over bus 150. Each of the DMA descriptors 170 points to a packet payload memory location that stores the packet payload of the packet header that corresponds to that DMA descriptor. Process blocks P1 and P2 may be performed in either order and/or concurrently with each other.

The packet header queue 180 and the packet descriptor queue 190 are included in a memory 123 of network device 120. A portion of the memory 123 may be reserved for Memory-Mapped Input/Output (MMIO) write transactions initiated by the host processing logic 110. MMIO refers to using a same addressing scheme on a same bus (e.g. the bus 150) so that a processing logic (e.g. the host processing logic 110) may address both a memory (e.g. the host memory 130) and additional devices (e.g. the network device 120) using the same addressing scheme and the same bus. The memory 123 may include Dynamic Random Access Memory (DRAM), Synchronous DRAM (SDRAM), and/or Double Data Rate (DDR), among other possibilities.

In the illustrated example, five packet headers 160 are written to the packet header queue 180 at entries 181 to 185 and five DMA descriptors 170 are written to the packet descriptor queue 190 at entries 191 to 195. In some implementations, each of the packet headers 160 and the DMA descriptors 170 may be written sequentially to the packet header queue 180 and the packet descriptor queue 190, respectively. In some implementations, two or more of the packet headers 160 may be written to the packet header queue 180 in a burst write transaction. Similarly, two or more of the DMA descriptors 170 may be written to the packet descriptor queue 190 in a burst write transaction. The burst write transactions may be MMIO writes. Using burst writes may further reduce write transaction traffic on bus 150, which may yield reduced latency in packet transmission. To facilitate burst transactions, the host processing logic 110 may write multiple DMA descriptors 170 to a single cache line and send out those multiple DMA descriptors 170 to the packet descriptor queue 190 in the same burst write transaction when the single cache line is filled with the DMA descriptors 170. Similarly, the host processing logic 110 may write multiple packet headers 160 to a single cache line and send out those multiple packet headers 160 to the packet header queue 180 in the same burst write transaction when the single cache line is filled with the packet headers 160.

In one example, the packet header queue 180 and the packet descriptor queue 190 includes storage for 1000 entries that are 128 bytes per entry. Of course, the packet header queue 180 and the packet descriptor queue 190 can be any suitable size. As illustrated in FIG. 1, the packet header queue 180 and the packet descriptor queue 190 may have a one-to-one correspondence so that a packet header written to the first entry of the packet header queue 180 corresponds to the DMA descriptor written to the first entry of the packet descriptor queue 190. In the illustrated embodiment, entry 181 of the packet header queue 180 corresponds with entry 191 of the packet descriptor queue 190 and entry 185 of the packet header queue 180 corresponds with entry 195 of the packet descriptor queue 190. The DMA descriptor in entry 191 will indicate where the packet payload of the packet header in entry 181 is stored, for example. The network device 120 may be a "peripheral device" in a computing system.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. The network device 120 may be a PCI-based endpoint in that it is configured to interface with a PCI-based bus 150.

In process block P3, a detection logic 164 of the network device 120 detects that the data segment(s) comprising a first packet header of the packet headers 160 have been written to the packet header queue 180 at entry 181. Alternatively or additionally, the detection logic 164 detects that the data segment(s) comprising a first DMA descriptor of the DMA descriptors 170 have been written to the packet descriptor queue 190 at entry 191. In one example, the detection logic 164 determines that a last data segment of the data segments comprising the first packet header have been written to the packet header queue 180 at entry 181. Similarly, in one example, the detection logic 164 determines that a last data segment of the data segments comprising the first DMA descriptor have been written to the packet descriptor queue 190 at entry 191.

In one example, the detection logic 164 detects one or more incoming write transaction from the host processing logic 110 that includes the data segments comprising the first packet header. The incoming write transactions may have destination addresses at entry 181 of the packet header queue 180 and/or the sizes of the write transactions may correspond to the size of a packet header. Similarly, in one example, the detection logic 164 detects one or more incoming write transaction from the host processing logic 110 that includes the data segments comprising the first DMA descriptor. The incoming write transactions may have destination addresses at entry 191 of the packet descriptor queue 190 and/or the sizes of the write transactions may correspond to the size of a DMA descriptor.

The detection logic 164 may include one or more processors, microprocessors, integrated circuits, FPGAs or other suitable processing logic or dedicated hardware for performing the described functions of the detection logic 164. For example, the detection logic 164 may be a general purpose computing device such as is manufactured by Intel®, AMD®, ARM®, Qualcomm®, and others. The detection logic 164 may be capable of executing software code.

Upon the detection logic 164 determining that the data segment(s) comprising the first packet header have been written to the packet header queue 180 and/or that the data segment(s) comprising the first DMA descriptor has been written to the packet descriptor queue 190, the detection logic 164 may notify the packet processor 163 that such data has been written and that the packet processor 163 should begin processing the first packet header and the first DMA descriptor.

In process block P4, in response to being notified that the first packet header and the first DMA descriptor have been written, the packet processor 163 begins processing the first packet header and the first DMA descriptor. The detection logic 164 may further inform the packet processor 163 of the locations (e.g., entry 181 and 191) in the packet header queue 180 and the packet descriptor queue 190 where the first packet header and the first DMA descriptor are located. In the illustrated example, packet processor 163 is illustrated with a dashed line to show that it is optional. In some examples, the detection logic 164 may instead notify the DMA engine 165.

The packet processor 163 accesses the first packet header from the packet header queue 180 at entry 181. The packet processor 163 may alternatively or additionally access the first DMA descriptor from the packet descriptor queue 190 at entry 191. In some embodiments, the packet processor 163 may modify the packet header in some way. In one example, the packet processor 163 modifies the first packet header to add a tunneling header for sending a packet through an IP tunnel.

In process block P5, the packet processor 163 programs the DMA engine 165 using the first DMA descriptor to bring the packet payload 137 from host memory 130 to network device 120. The packet payload 137 corresponds to the first packet header. The DMA engine 165 may use the first DMA descriptor to determine the packet payload memory location in the host memory 130 so that the DMA engine 165 can perform a DMA operation to fetch the packet payload from the packet payload memory location over the bus 150, in process block P6. While the illustrated example shows the packet payload 137 as being located in host memory 130, it should be understood that FIG. 1 is an example and that, in some implementations, the packet payload 137 may be located in memory 123 or at some other memory location referenced by the first DMA descriptor.

The host processing logic 110 may have a driver running on an operating system of the host processing logic 110. The driver may be for interacting with the network device 120. The driver running on the host processing logic 110 may store the packet payload 137 in the packet payload memory location prior to sending the first packet header and the first DMA descriptor to the network device 120. In the illustrated embodiment, the packet payload 137 is stored in a driver memory block 133 that is reserved for the driver running on the host processing logic 110.

In process block P7, the DMA engine 165 provides the first packet header and the fetched packet payload 137 to the network interface 175 for transmission as packet 199 onto a network. The network interface 175 may be an ethernet interface, in some examples. The network device 120 may further transmit a packet that includes the first packet header (or modified version of the first packet header) and the packet payload onto the network and write a completion queue entry to a completion queue in the host memory 130 to indicate that the packet was successfully transmitted onto the network.

In process block P8, which may occur after process block P7, the host processing logic 110 finishes writing the packet headers 160 to the packet header queue 180 at entries 181 to 185. In process block P9, which may also occur after process block P7, the host processing logic 110 finishes writing the DMA descriptors 170 to the packet descriptor queue 190 at entries 191 to 195.

In process block P10, the host processing logic 110 sends a packet notifier to the network device 120. The packet notifier may notify the network device 120 that the host processing logic 110 has finished writing the packet headers 160 to the packet header queue 180 and the DMA descriptors 170 to the packet descriptor queue 190 such that the packet headers 160 and the DMA descriptors 170 are ready for processing. The packet notifier may further indicate the addresses or entries to which the packet headers 160 and the DMA descriptors 170 were written (e.g., entries 181 to 185 and 191 to 195, respectively).

In the illustrated example, the network device 120 includes an optional doorbell register 179. The doorbell register 179 may be mapped in the MMIO space of the host processing logic 110. The host processing logic 110 may write to the doorbell register 179 as a way of "sending the packet notifier." The doorbell register 179 may be reserved for receiving writes that serve as a "doorbell." In one example, a tail pointer is written to the doorbell register 179. The tail pointer can tell the network device 120 which address or index of the entry (e.g. entry 195) in the packet descriptor queue 190 the last DMA descriptor 170 was written to so the network device 120 can process the packet headers up to the entry indicated by the tail pointer and mark the processing progress with a header pointer that chases the tail pointer around a circular queue. In cases where the packet header queue 180 and the packet descriptor queue 190 have a one-to-one correspondence, the tail pointer indicating the last entry of the last packet headers 160 can be used to ascertain where the last DMA descriptor was written, and vice versa. In one example, the host processing logic 110 may "send the packet notifier" by generating an interrupt that is received by the network device 120. Similarly, the network device 120 may "receive the packet notifier" by receiving the interrupt that is generated by the host processing logic 110.

In process block P11, the packet processor 163 is notified that the packet notifier was received (e.g., that the doorbell register 179 has been written) indicating that the network device 120 should continue processing the packet headers 160 and the DMA descriptors 170. For example, the network device 120 may begin processing any packet headers 160 and DMA descriptors 170 that have not yet been processed, such as the fifth packet header stored at entry 185 of the packet header queue 180 and the fifth DMA descriptor stored at entry 195 of the packet descriptor queue 190. The packet processor 163 may, for example, access the content of doorbell register 179, which may be a tail pointer that informs the packet processor 163 of where the last packet header was written to.

Figure 2A:
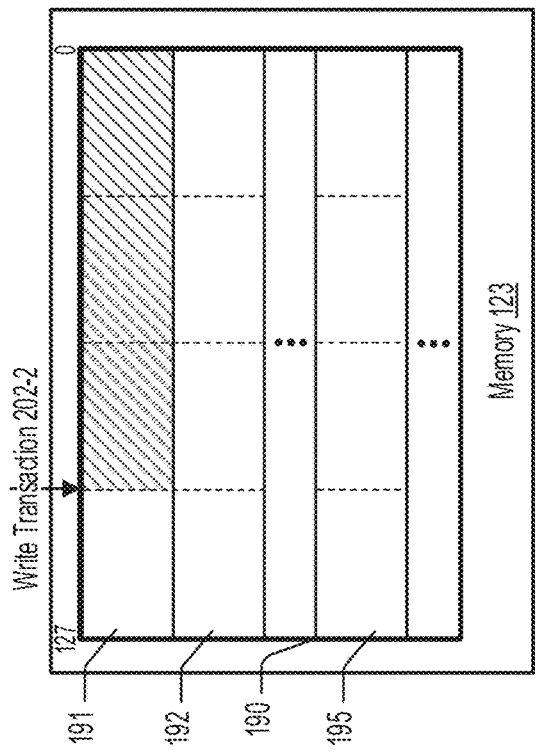
FIGS. 2A-2H illustrate an example of a detection logic detecting that DMA descriptors are written to a packet descriptor queue.
Figure 2B:
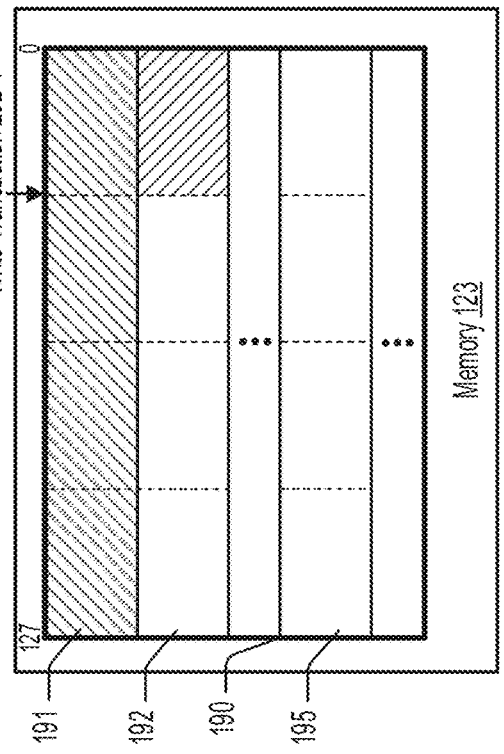
Figure 2C:
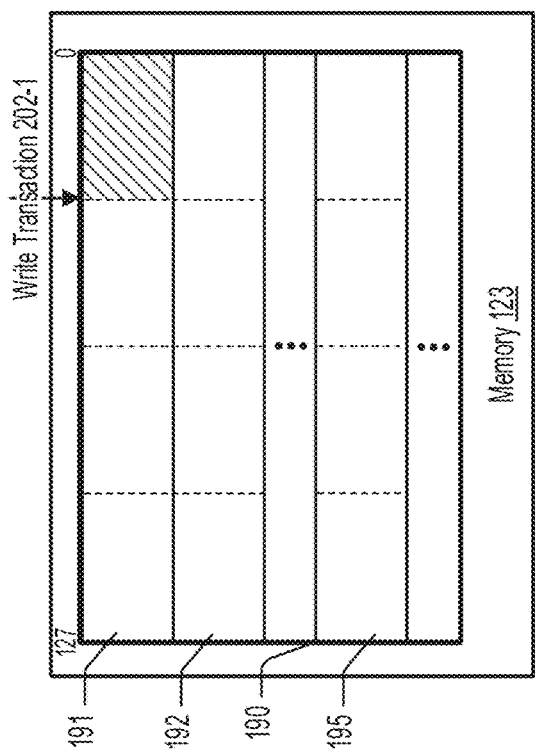

FIGS. 2A-2H illustrate an example of the detection logic 164 detecting that the DMA descriptors 170 are written to the packet descriptor queue 190. In FIG. 2A, a write transaction 202-1 having a write data size of 32 bytes and a write address of Address 0 within entry 191 of the packet descriptor queue 190 is detected by the detection logic 164. Thereafter, in FIG. 2B, a write transaction 202-2 having a write data size of 64 bytes and a write address of Address 31 within entry 191 is detected by the detection logic 164. Based on the combined size of the write transactions 202-1 and 202-2, the detection logic 164 can determine that the first DMA descriptor has not been completely written to entry 191. Thereafter, in FIG. 2C, a write transaction 202-3 having a write data size of 32 bytes and a write address of Address 95 within entry 191 is detected by the detection logic 164. Based on the combined size of the write transactions 202-1, 202-2, and 202-3, the detection logic 164 can determine that each data segment of the first DMA descriptor has been written to entry 191. The detection logic 164 may then notify the packet processor 163 that it may begin processing the first DMA descriptor (and/or the first packet header).

Figure 2D:
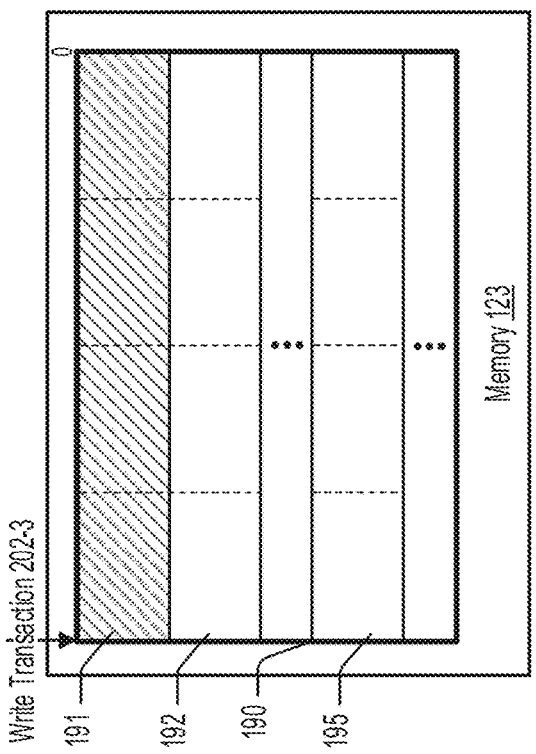
Figure 2E:
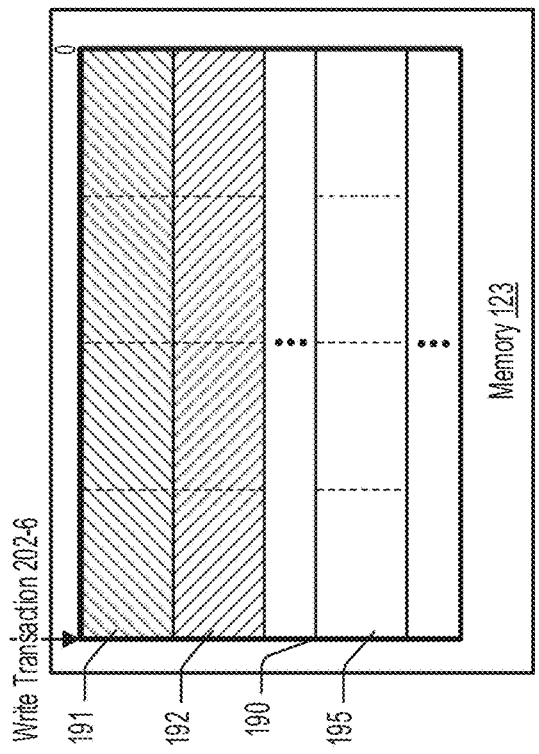
Figure 2F:
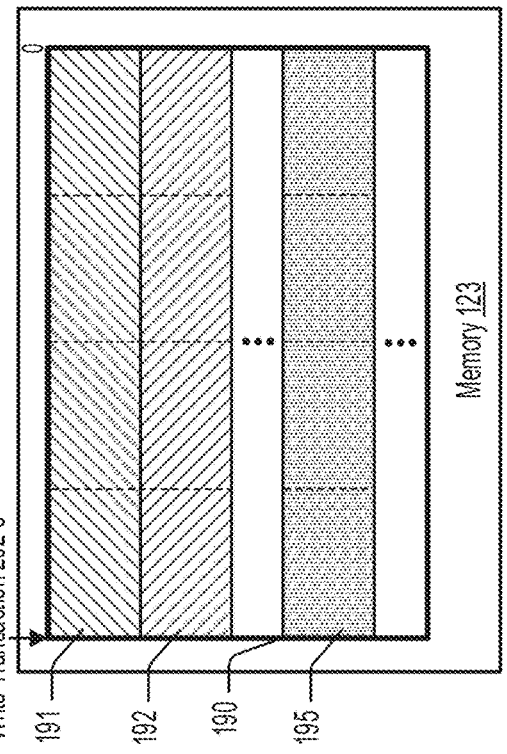

In FIG. 2D, a write transaction 202-4 having a write data size of 32 bytes and a write address of Address 0 within entry 192 of the packet descriptor queue 190 is detected by the detection logic 164. Thereafter, in FIG. 2E, a write transaction 202-5 having a write data size of 32 bytes and a write address of Address 31 within entry 192 is detected by the detection logic 164. Based on the combined size of the write transactions 202-4 and 202-5, the detection logic 164 can determine that the second DMA descriptor has not been completely written to entry 192. Thereafter, in FIG. 2F, a write transaction 202-6 having a write data size of 64 bytes and a write address of Address 63 within entry 192 is detected by the detection logic 164. Based on the combined size of the write transactions 202-4, 202-5, and 202-6, the detection logic 164 can determine that each data segment of the second DMA descriptor has been written to entry 192. The detection logic 164 may then notify the packet processor 163 that it may begin processing the second DMA descriptor (and/or the second packet header).

Figure 2G:
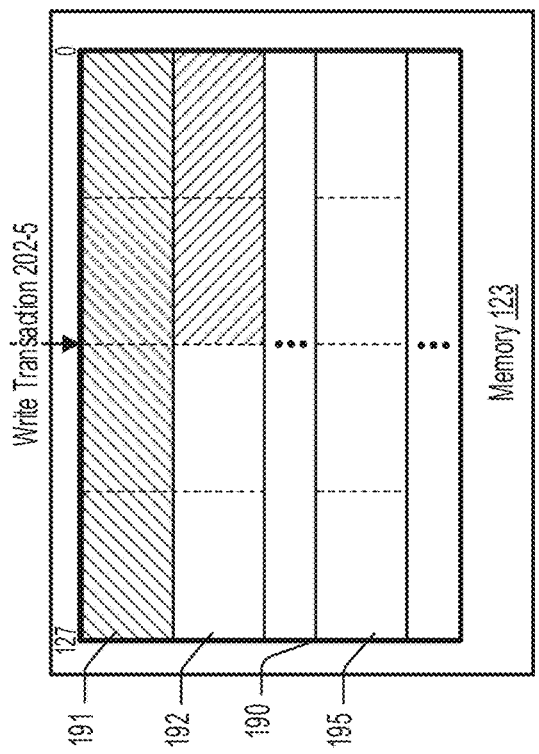
Figure 2H:
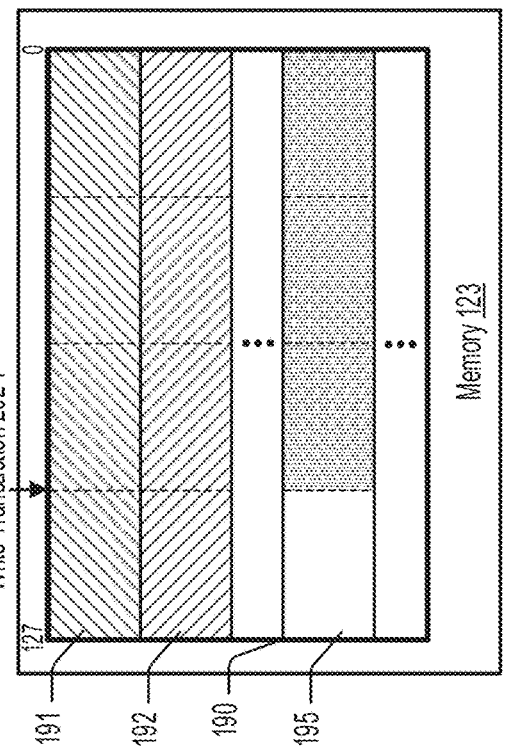

In FIG. 2G, a write transaction 202-7 having a write data size of 96 bytes and a write address of Address 0 within entry 195 of the packet descriptor queue 190 is detected by the detection logic 164. Thereafter, in FIG. 2H, a write transaction 202-8 having a write data size of 32 bytes and a write address of Address 95 within entry 195 is detected by the detection logic 164. Based on the combined size of the write transactions 202-7 and 202-8, the detection logic 164 can determine that each data segment of the fifth DMA descriptor has been written to entry 195. The detection logic 164 may then notify the packet processor 163 that it may begin processing the fifth DMA descriptor (and/or the fifth packet header).

Alternatively or additionally, the detection logic 164 can determine that each data segment of the first, second, and fifth DMA descriptors have been written to entries 191, 192, and 195, respectively, by detecting that the last data segment of the corresponding DMA descriptor has been written to the respective entry. For example, in FIG. 2C, the detection logic 164 can detect that (at least a portion of) a data segment has been written to Address 126 of entry 191. Similarly, in FIG. 2F, the detection logic 164 can detect that (at least a portion of) a data segment has been written to Address 126 of entry 192. Similarly, in FIG. 2H, the detection logic 164 can detect that (at least a portion of) a data segment has been written to Address 126 of entry 195.

It should be understood that FIGS. 2A-2H are merely examples and that, in some implementations, the data segments comprising the DMA descriptors may be written out of order for a given DMA descriptor (e.g., the last 32 bytes may be written first, the first 32 bytes may be written next, and the middle 64 bytes may be written last) and/or may be written out of order for different DMA descriptors (e.g., the last 32 bytes of the second DMA descriptor may be written first, the middle 64 bytes of the first DMA descriptor may be written next, the first 32 bytes of the second DMA descriptor may be written next, and so on).

Figure 3A:
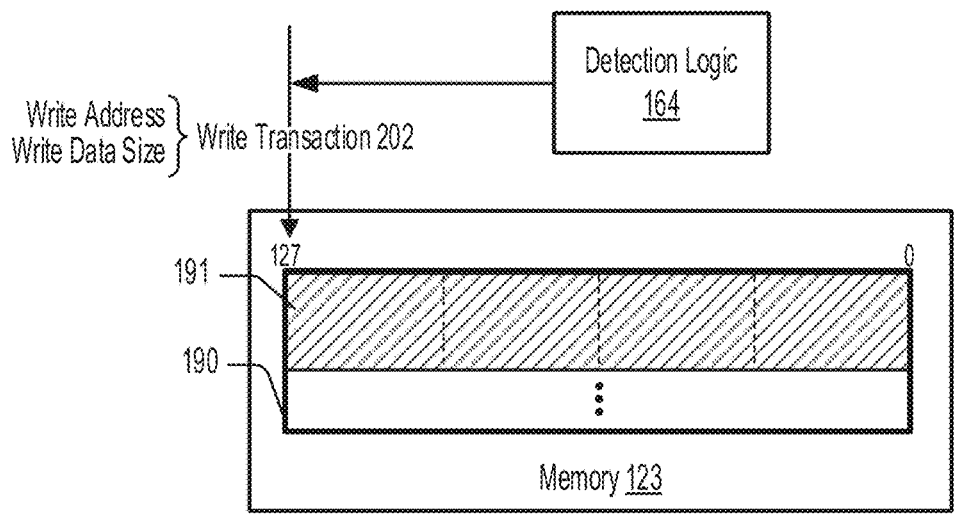
FIGS. 3A-3C illustrate three different examples of how detection logic can detect that a first DMA descriptor has been completely written to an entry of a packet descriptor queue.
Figure 3B:
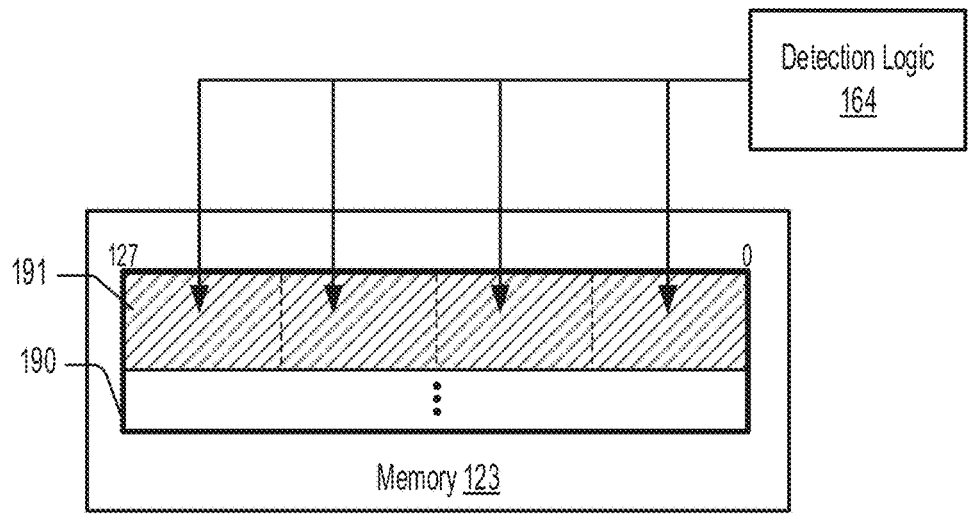
Figure 3C:
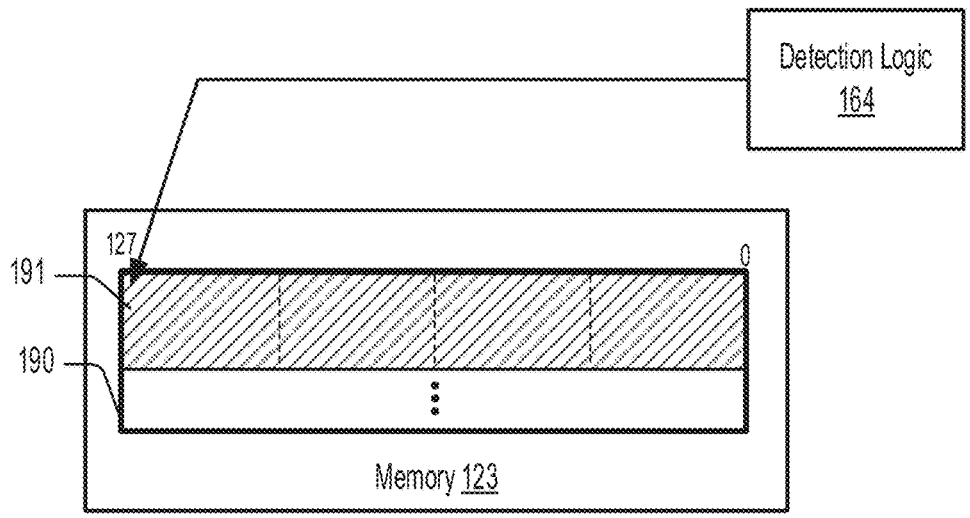

FIGS. 3A-3C illustrate three different examples of how the detection logic 164 can detect that the first DMA descriptor has been completely written to entry 191 of the packet descriptor queue 190. In FIG. 3A, the detection logic 164 detects that the first DMA descriptor has been completely written to entry 191 by monitoring all incoming write transactions 202 to entry 191. The detection logic 164 may monitor the write addresses and/or the write data sizes of the write transactions 202, as described in reference to FIGS. 2A-2H, and may infer when each of the data segments comprising the first DMA descriptor have been written by, for example, determining when the write data sizes of the write transactions 202 equal the size of the first DMA descriptor. In some examples, by monitoring the write addresses of the write transactions 202, the detection logic 164 can determine whether a particular write transaction is to entry 191 or to another entry of the packet descriptor queue 190.

In FIG. 3B, the detection logic 164 detects that the first DMA descriptor has been completely written to entry 191 by monitoring entry 191 itself at multiple addresses. In some examples, the detection logic 164 can monitor an address where each data segment of the first DMA descriptor would be written. For example, the detection logic 164 may monitor at least one address between Addresses 0 and 30 of entry 191 (for a first data segment of the set of data segments comprising the first DMA descriptor), at least one address between Addresses 31 and 62 of entry 191 (for a second data segment of the set of data segments comprising the first DMA descriptor), at least one address between Addresses 63 and 94 of entry 191 (for a third data segment of the set of data segments comprising the first DMA descriptor), and at least one address between Addresses 95 and 126 of entry 191 (for a fourth data segment of the set of data segments comprising the first DMA descriptor).

In FIG. 3C, the detection logic 164 detects that the first DMA descriptor has been completely written to entry 191 by monitoring a last address of entry 191. For example, the detection logic 164 can monitor Address 126 of entry 191. When a data segment of the first DMA descriptor has been written to Address 126, the detection logic 164 may determine that the first DMA descriptor has been completely written to entry 191.

Figure 4:
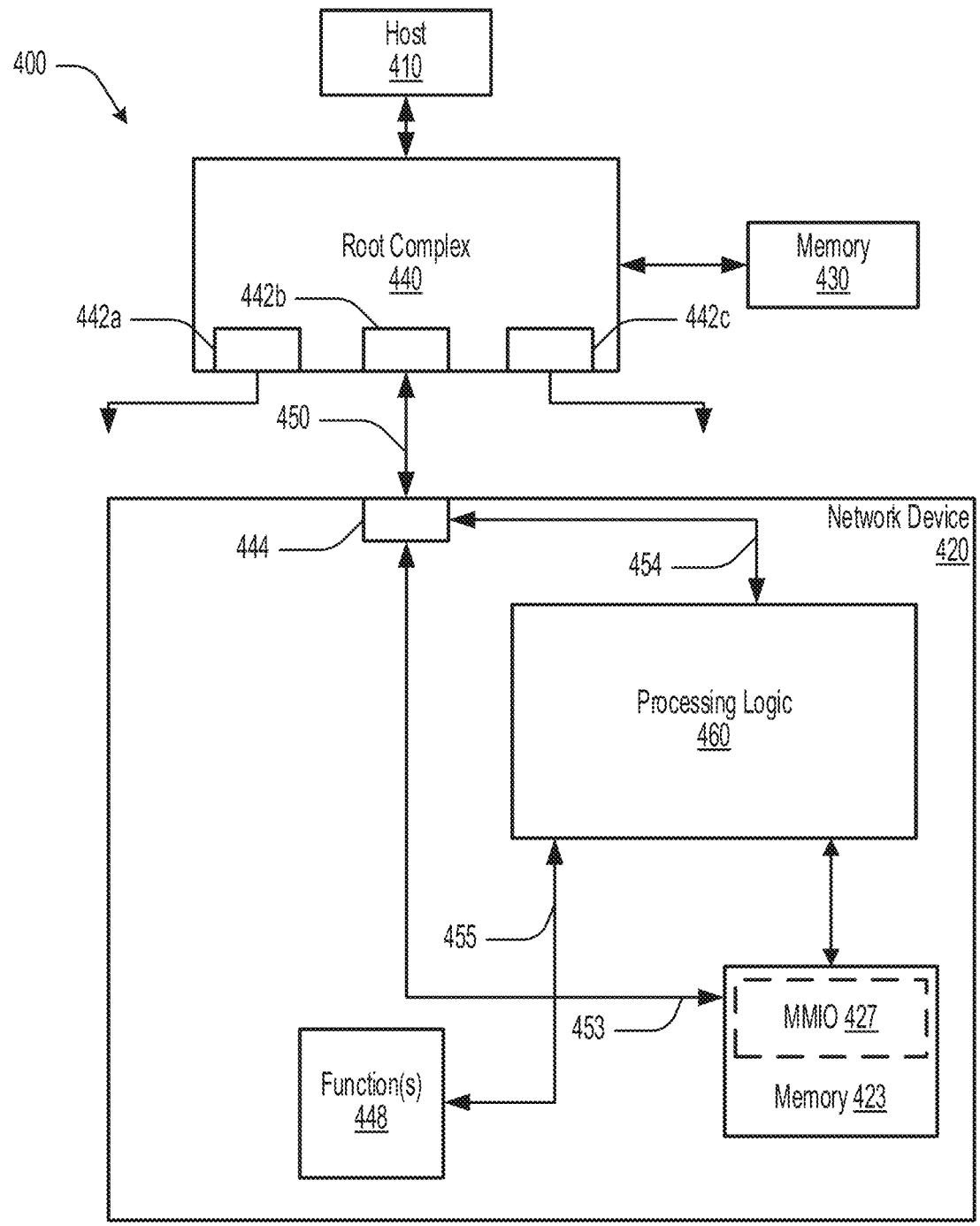
FIG. 4 illustrates an example of a computing system including host processing logic, a memory, and a network device.

FIG. 4 illustrates an example of a computing system 400 including a host processing logic 410, a memory 430, and a network device 420. The host processing logic 410 is an example of the host processing logic 110 and the network device 420 is an example of the network device 120. The memory 430 may be used as host memory to the host processing logic 410. In the illustrated example, the network device 420 is in communication with a root complex 440 over a PCI interconnect 450. The PCI interconnect 450 is one example of the bus 150. The root complex 440 is in communication with the host processing logic 410 and a memory subsystem 430. In some implementations, the root complex 440 may include a memory controller to manage transactions to and from memory 430. In other implementations, host processing 410 may include a memory controller. The packet headers 160 and the DMA descriptors 170 may be routed from the host processing logic 410 to the network device 420 and/or the memory 430 via the root complex 440.

The memory subsystem 430 provides temporary or long-term storage for data that may be used by the computing system 400. The root complex 440 may include one or more ports 442a-c. These ports 442a-c may be connected, using additional PCI interconnects, to PCI switches, bridges, and endpoints, including the illustrated network device 420, which may be a PCI endpoint. The root complex 440 may route transactions between the host processing logic 410 and any of the endpoints, switches, or bridges, or between the endpoints, switches, and bridges themselves. In this example, PCI is used as an example of a bus protocol that may be implemented by the computing system 400 to connect to network device 420 and/or other peripheral devices. In various implementations, the computing system 400 can alternatively or additionally connect to peripheral devices using other bus protocols, such as SCSI, SATA, or PATA, among others, or a combination of different bus protocols including PCI.

The illustrated network device 420 in this example includes a bus interface 444, which may be a PCI-based bus interface configured to send and receive data on a PCI-based bus. The bus interface 444 may include a physical interface for connecting to a cable, socket, port, or other connection to the PCI interconnect 450. The bus interface 444 may further include hardware and/or software to manage incoming and outgoing transactions. The bus interface 444 may translate an internal transaction generated by function(s) 448 or processing logic 460 into a PCI transaction for transmission over the PCI interconnect 450. The bus interface 444 may further translate transactions received over the PCI interconnect 450 for transfer to the functions 448 or to the processing logic 460. The bus interface 444 may receive the packet headers 160 and the DMA descriptors 170 over the PCI interconnect 450, which is an example of the bus 150. The bus interface 444 may write the packet headers 160 to the packet header queue 180 in response to receiving the packet headers 160. Similarly, the bus interface 444 may write the DMA descriptors 170 to the packet descriptor queue 190 in response to receiving the DMA descriptors 170.

Processing logic 460 may include one or more processors, microprocessors, field-programmable gate arrays (FPGAs), or other suitable processing logic. The processors may be general purpose computing devices such as are manufactured by Intel®, AMD®, ARM®, Qualcomm®, and others. Processing logic 460 is generally capable of executing software code. A processor may include multiple processing cores. Processing logic 460 may include the packet processor 163, detection logic 164, and DMA engine 165 of FIG. 1.

Memory 423 may include Dynamic Random Access Memory (DRAM), Synchronous DRAM (SDRAM), and/or Double Data Rate (DDR), among others. MMIO memory 427 in the memory 423 is reserved for MMIO write transactions, in FIG. 4. The MMIO memory 427 may be reserved in an initialization process upon startup of a computing system, for example. The packet header queue 180 and the packet descriptor queue 190 may be stored in the MMIO memory 427. In one example, the doorbell register 179, the packet header queue 180, and the packet descriptor queue 190 remain static after the initialization process. Alternatively, the doorbell register 179, the packet header queue 180, and the packet descriptor queue 190 may be changed dynamically by one or more drivers running on the host processing logic 410 after the initialization process.

The network device 420 includes the function(s) 448, in the illustrated example. The function(s) 448 may include hardware and/or software that provide one or more services for the network device 420. A service in this context describes the operations and capabilities of the network device 420, and the functionality that the network device 420 provides to the computing system 400. The function(s) 448 may include the hardware and/or software to provide a network interface, including ports for connecting Category-5 (CAT-5) cables, and/or antennas for connecting wirelessly to a network. The internal interconnect 454 that connects the processing logic 460 with the bus interface 444 may be implemented using a standard bus protocol, such as Coherent Hub Interface (CHI), Advanced extensible Interface (AXI), Advanced High-Performance Bus (AHB), or the like. The internal interconnect 454 may also be implemented using a proprietary bus protocol. In one example, an internal interconnect 453 connects the bus interface 444 with the memory 423 and the bus interface 444 can write data to the memory 423 without going through the processing logic 460. The internal interconnect 453 may use the same bus protocol as the internal connect 454. In one embodiment, an internal interconnect 455 connects the processing logic 460 with the function(s) 448. The internal interconnect 455 may use the same bus protocol as the internal connect 454.

Figure 5:
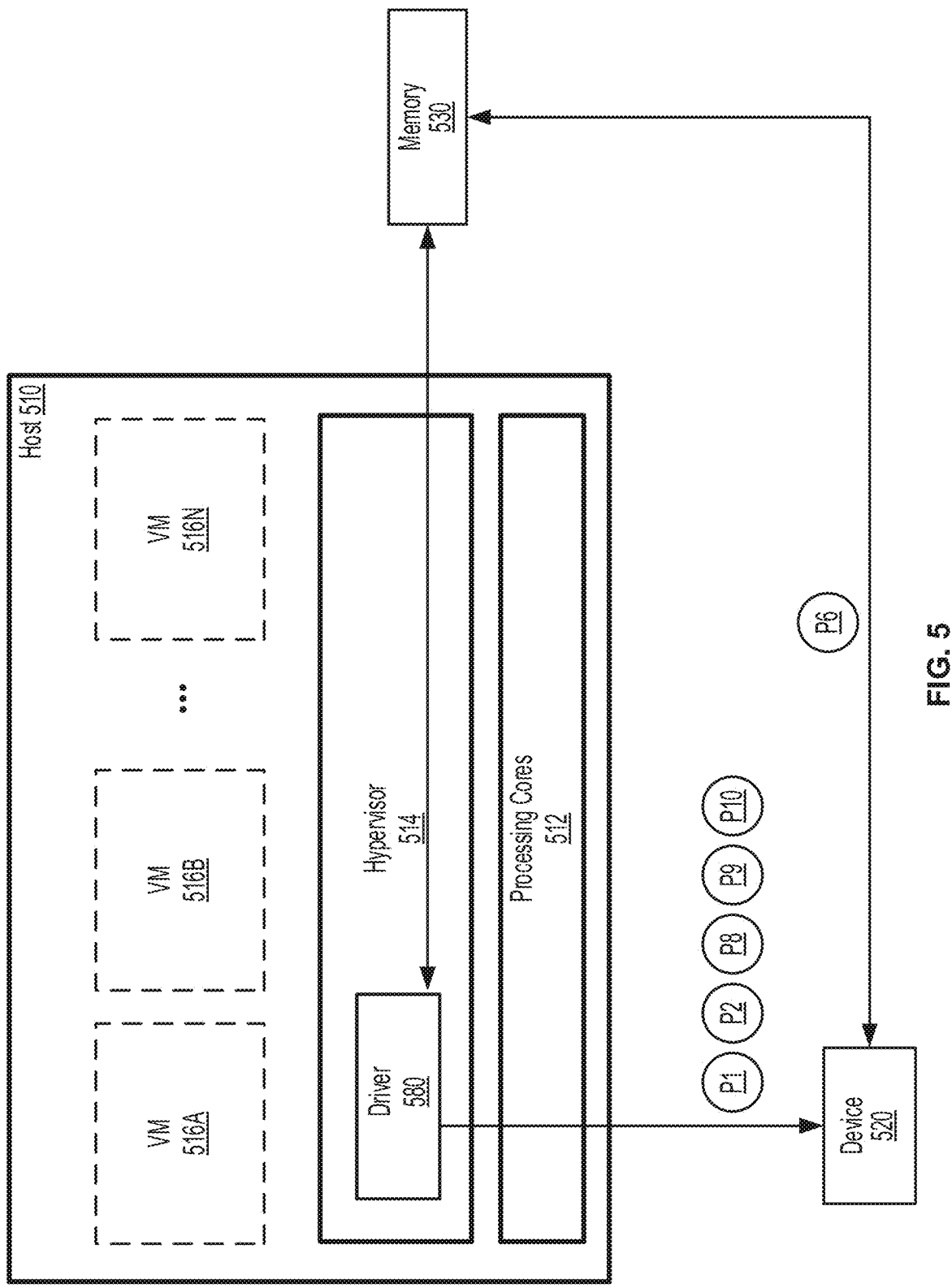
FIG. 5 illustrates an example host that includes processing cores and is running a plurality of virtual machine instances.

FIG. 5 illustrates an example host 510 that includes processing cores 512 and is running a plurality of virtual machine instances 516. The host 510 may be used in place of the host processing logic 110, 410, in some embodiments. In some implementations, the host 510 may provide different services such as compute services, network services, etc. to various clients. For example, the compute services may include providing virtual or physical resources to the client computers, e.g., by launching virtual machine instances of various sizes, associating storage volumes to the virtual machines on demand, providing client computers with resources to run applications by renting virtual machines, data processing, storage, etc. The network services may include network related functionalities such as network traffic shaping, network acceleration, network storage processing, network switching, etc. A plurality of virtual machines 516A-516N, e.g., a first virtual machine 516A, a second virtual machine 516B and an Nth virtual machine 516N, may be configured to run on the host 510. For example, each of the virtual machines may execute a respective guest operating system (not shown) on the host 510.

The host 510 includes a hypervisor 514 and the processing cores 512. The processing cores 512 may include a plurality of processing cores that may be configured to execute a plurality of instructions that may be stored in a computer readable storage medium (not illustrated). The computer-readable storage medium may be non-transitory. In some instances, the computer readable medium may be part of a host memory such as the memory 430, e.g., RAM, ROM, EEPROM, flash memory, or any suitable storage media. In some instances, the host 510 may include an x86 CPU platform, e.g., Xeon, Pentium, etc., an ARM platform, or a PowerPC platform, etc. for running an operating system (not shown). The hypervisor 514 may be configured to manage one or more virtual machines on the host 510, e.g., to create, start, monitor, stop or to delete the virtual machines 516A-516N. The hypervisor 514 can also manage the flow of information between software, the virtualized hardware, and the physical hardware.

In the illustrated embodiment, the hypervisor 514 executes driver 580, which is for interacting with the network device 420. The driver 580 controls the writes of the packet headers 160 and the DMA descriptors 170 to the network device 420, as indicated by the illustrated process blocks P1, P2, P8, and P9 in FIG. 5. The driver 580 may also be responsible for sending the packet notifier associated with process block P10. The driver 580 may also write the corresponding packet payloads to memory 430 so that the DMA engine of the network device 420 can fetch the packet payloads from the memory 430, as illustrated by process block P6. In one embodiment (not illustrated), the driver 580 is not executed by the hypervisor 514—rather each virtual machine executes their own driver to send the packet headers 160, the DMA descriptors 170 (and any notifier/doorbell) to the network device 420. In one example, the virtual machine 516A-516N can be configured to reserve their own packet header queue 180 and packet descriptor queue 190 (in the memory 423 of the network device 420). The virtual machine 516A-516N may also be configured to reserve their own driver memory block 133 that is specific to their respective guest operating system physical address or virtual address within the host memory 430. In one embodiment, the driver 580 is included in an operating system operating in a bare-metal environment that doesn't include multiple VMs running on the same host.

Figure 6:
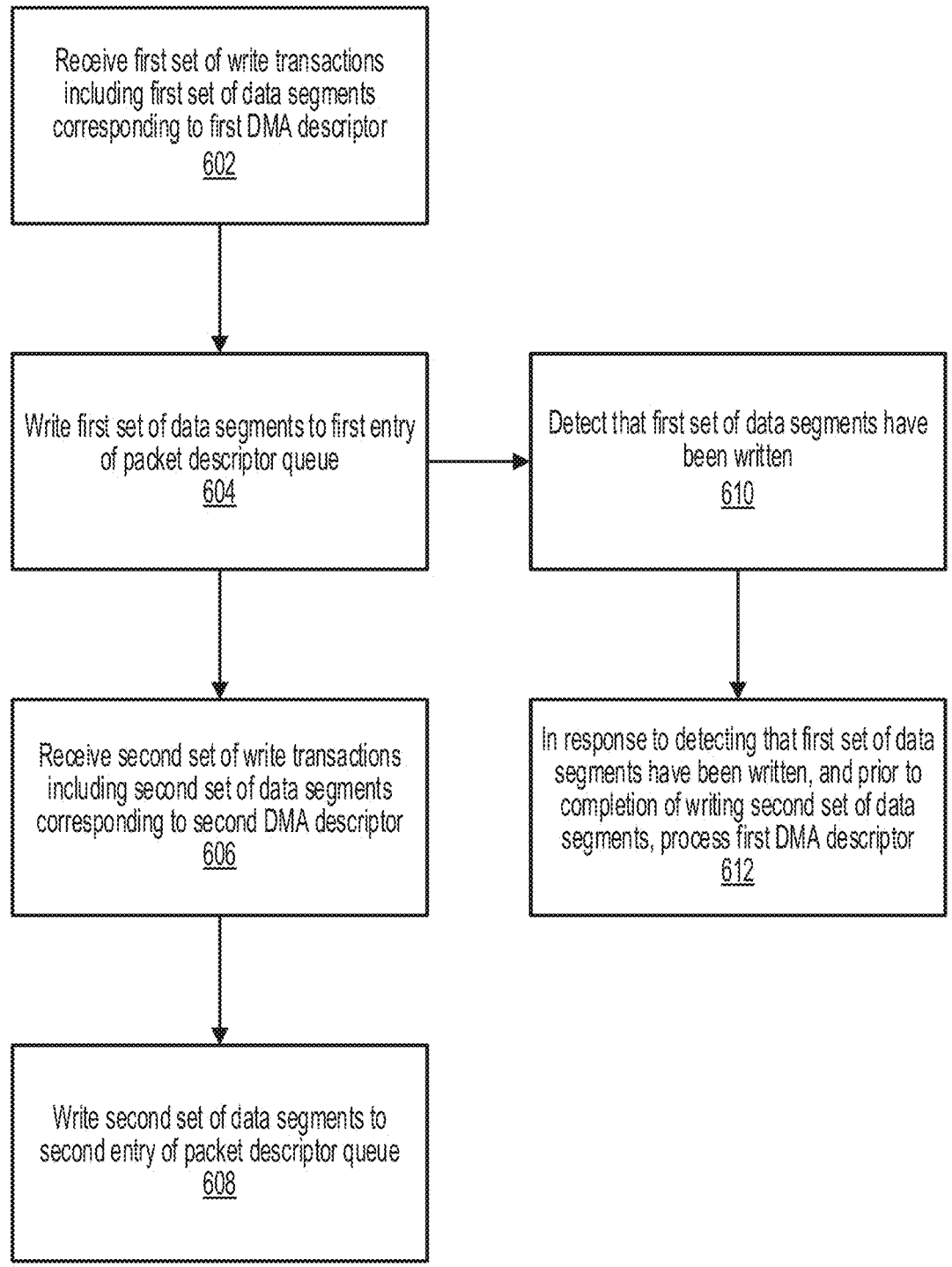
FIG. 6 depicts an illustrative flow chart demonstrating an example process of delivering one or more packets from a host to a network device.

FIG. 6 depicts an illustrative flow chart demonstrating an example process 600 of delivering one or more packets from a host to a network device. The network device may be a network interface card (NIC). The process 600 is illustrated as a logical flow diagram, each operation of which can represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by network devices 120 or 420. The code may be stored on a computer-readable storage medium of network device 120 or 420, for example, in the form of a computer program including a plurality of instructions executable by one or more processors. The computer-readable storage medium may be non-transitory.

In process block 602, a first set of write transactions (e.g., write transactions 202-1, 202-2, 202-3) are received from a host (e.g., host processing logic 110, hosts 410, 510). The first set of write transactions may be received by a network device (e.g., network devices 120, 420, device 520). The first set of write transactions may include a first set of data segments that comprise a first DMA descriptor (e.g., DMA descriptor 170). The first DMA descriptor may point to a first packet payload memory location in a host memory (e.g., host memory 130) where a packet payload (e.g., packet payload 137) is to be stored. The first set of write transactions may be MMIO write transactions.

In process block 604, the first set of data segments are written to a first entry (e.g., entry 191) of a packet descriptor queue (e.g., packet descriptor queue 190). The packet descriptor queue may be stored in a memory (e.g., memory 123, 423) of the network device. The first set of data segments may be written sequentially or simultaneously to the first entry.

In process block 606, a second set of write transactions (e.g., write transactions 202-4, 202-5, 202-6 or write transactions 202-7, 202-8) are received from the host. The second set of write transactions may be received by the network device. The second set of write transactions may include a second set of data segments that comprise a second DMA descriptor (e.g., DMA descriptor 170). The second DMA descriptor may point to a second packet payload memory location in the host memory. The second set of write transactions may be MMIO write transactions.

In process block 608, the second set of data segments are written to a second entry (e.g., entry 192 or entry 195) of the packet descriptor queue. The second set of data segments may be written sequentially or simultaneously to the second entry.

In process block 610, it is detected that the first set of data segments have been written to the first entry of the packet descriptor queue. A detection logic (e.g., detection logic 164, processing logic 460) of the network device may detect that the first set of data segments have been written to the first entry of the packet descriptor queue. The detection logic may, for example, detect that a last data segment of the first set of data segments has been written to the first entry. This may be accomplished, for example, by monitoring a last address of the first entry. As another example, the detection logic may monitor multiple addresses of the first entry, which each of the multiple addresses corresponding to one of the first set of data segments. As another example, the detection logic may monitor incoming write transactions and extract the write addresses and/or the write data sizes of the incoming write transactions. In some embodiments, when the combined data size of the write data sizes having write addresses within the first entry exceed a threshold, it may be determined that all of the first set of data segments have been written to the first entry.

In process block 612, in response to detecting that the first set of data segments have been written to the first entry of the packet descriptor queue, and prior to completion of writing the second set of data segments, the first DMA descriptor is processed by the network device. The first DMA descriptor may further be processed prior to receiving a packet notifier from the host. In some embodiments, processing the first DMA descriptor may include accessing the first DMA descriptor from the packet descriptor queue. Processing the first DMA descriptor may further include determining the first packet payload memory location from the first DMA descriptor. Processing the first DMA descriptor may further include fetching, by a DMA engine (e.g. DMA engine 165) of the network device, a packet payload (e.g., packet payload 137) stored in the first packet payload memory location. Processing the first DMA descriptor may further include providing the packet payload to a network interface (e.g., network interface 175) of the network device.

Figure 7:
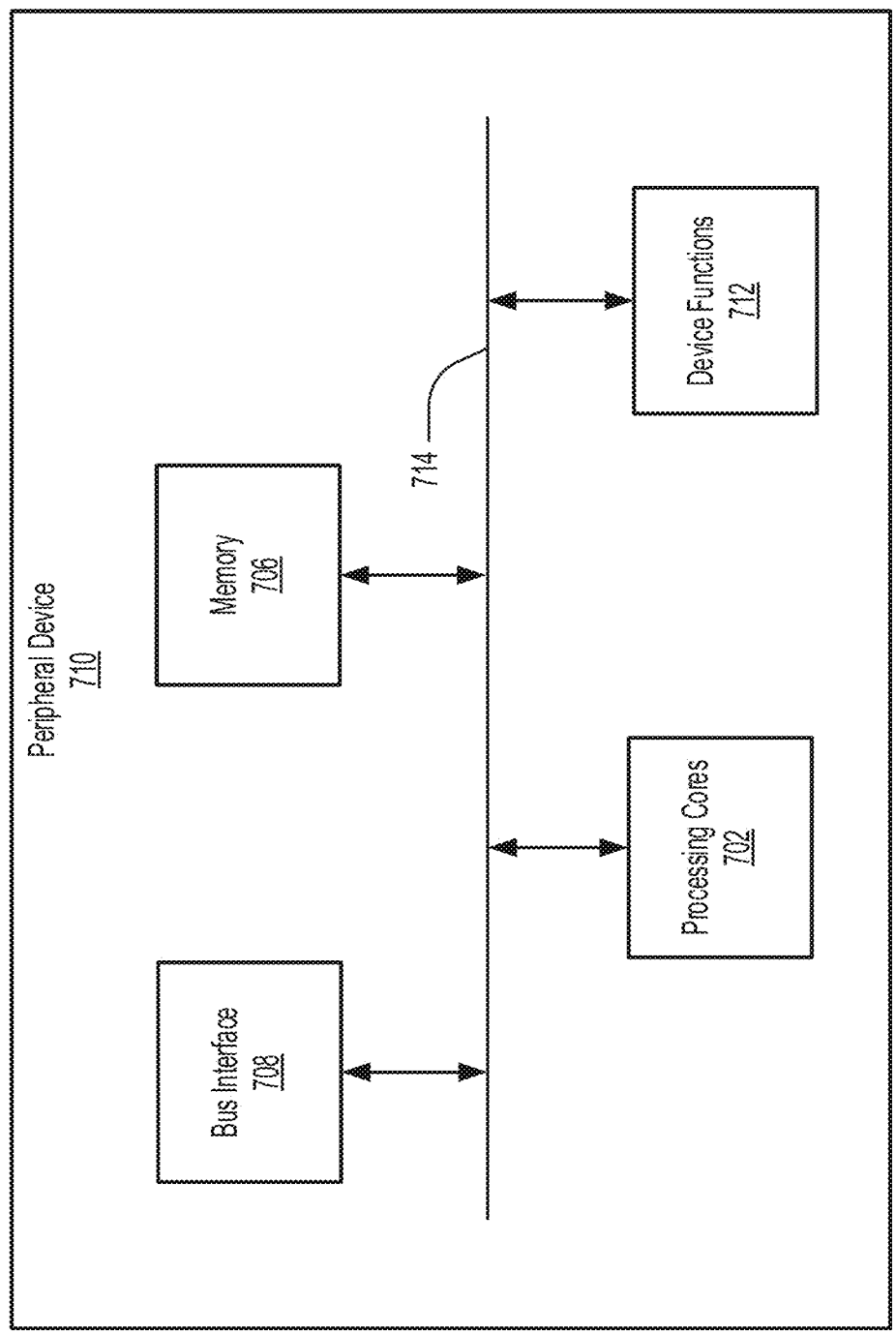
FIG. 7 illustrates an example architecture of a peripheral device that may be used in embodiments where network devices are peripheral devices.

FIG. 7 illustrates an example architecture of a peripheral device 710 that may be used in embodiments where network devices 120, 420 are peripheral devices. Peripheral device 710 includes processing cores 702, a bus interface 708, memory 706, and device functions 712. These modules may be hardware modules, software modules, or a combination of hardware and software. Peripheral device 710 may include additional modules, not illustrated here. In some implementations, peripheral device 710 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing cores 702 may include one or more processors configured to execute instructions. Examples of processors that may be included in the processing cores 702 include processors developed by ARM®, MIPS®, AMD®, Intel®, Qualcomm®, and the like. In some implementations, the processors of the processing cores 702 may share certain resources, such as for example busses, level 1 (L1) caches, and/or level 2 (L2) caches. The instructions executed by the processing cores 702 may be stored on a computer-readable storage medium, for example, in the form of a computer program. The computer-readable storage medium may be non-transitory. In some cases, the computer readable medium may be part of the memory 706.

The memory 706 may include either volatile or non-volatile, or both volatile and non-volatile types of memory. The memory 706 may, for example, include random access memory (RAM), read-only memory (ROM), Electrically Erasable Programmable Read-Only Memory (EEPROM), flash memory, and/or some other suitable storage media.

The bus interface 708 may enable communication with external entities, such as a host device and/or other components in a computing system, over an external communication medium. The bus interface 708 may include a physical interface for connecting to a cable, socket, port, or other connection to the external communication medium. The bus interface 708 may further include hardware and/or software to manage incoming and outgoing transactions. The bus interface 708 may implement a local bus protocol, such as NVMe, AHCI, SCSI, SAS, SATA, PATA, or some other standard protocol, or a proprietary bus protocol. The bus interface 708 may include at least the physical layer for any of these bus protocols, including a connector, power management, and error handling, among other things. In some implementations, peripheral device 710 may include multiple bus interfaces for communicating with multiple external entities. These multiple bus interfaces may implement the same local bus protocol, different local bus protocols, or a combination of the same and different bus protocols.

The device functions 712 may include hardware and/or software for implementing features available to peripheral device 710. The device functions 712 may, for example, include physical connectors for connecting to devices such as printers, monitors, external storage drives, network cables, and other input, output, and/or networking devices. The device functions 712 may further include hardware and/or software configured to implement a protocol for communicating with externally connected devices or functions. For example, the device functions 712 may implement a network interface for communicating with network equipment, such as switches, routers, modems, and/or wireless access points. Alternatively or additionally, the device functions 712 may include hardware and/or software configured to implement functionality provided directly by the peripheral device 710. For example, the device functions 712 may include hardware and/or software configured to implement a solid state hard drive. In some implementations, peripheral device 710 may include multiple device functions, each configured to provide different functionality. For example, in these implementations, peripheral device 710 may include device functions for communicating with a wired Ethernet network, device functions for communicating with a wireless 802.11 network, and device functions providing a storage array.

In some implementations, peripheral device 710 is a PCI-based device. In these implementations, peripheral device 710 includes a PCI interface for communicating with a host device such as host 110, 410. A PCI-based device may include one or more functions. A "function" describes operations that may be provided by peripheral device 710. For example, a PCI device may provide a network adapter.

In some implementations, peripheral device 710 may include single-root I/O virtualization (SR-IOV). SR-IOV is an extended capability that may be included in a PCI device. SR-IOV allows a physical resource (e.g., a single network interface controller) to appear as multiple resources (e.g., sixty-four network interface controllers). Thus, a PCI device providing a certain functionality (e.g., a network interface controller) may appear to a device making use of the PCI device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are lightweight functions that lack configuration resources, and are generally controlled by the configuration of their underlying physical functions. Each of the physical functions and/or virtual functions may be assigned to a respective thread of execution (such as for example, a virtual machine) running on a host device.

Figure 8:
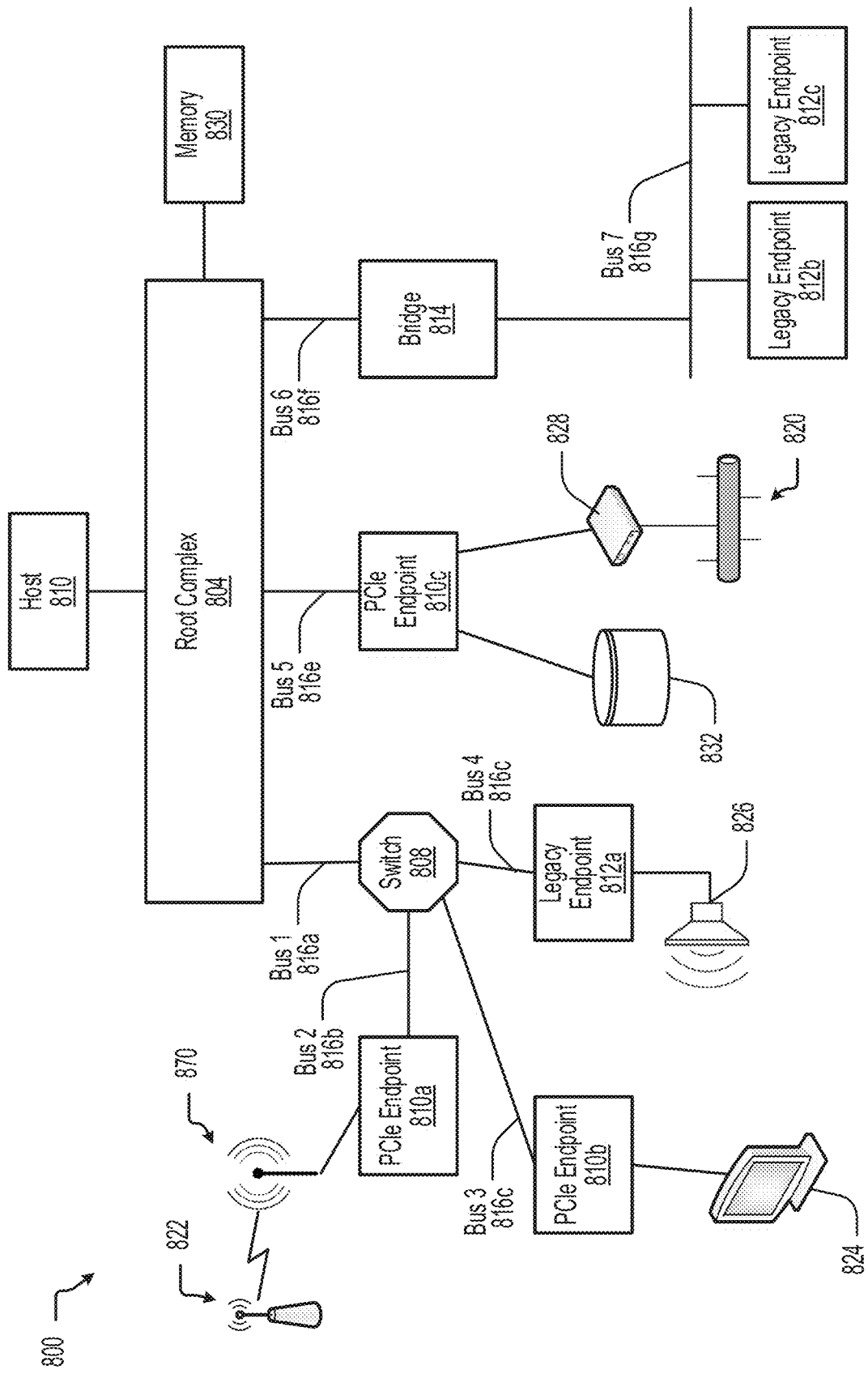
FIG. 8 illustrates an example of a computing system that includes multiple peripheral devices.

FIG. 8 illustrates an example of a computing system 800 that includes multiple peripheral devices. Peripheral devices may include hardware devices and/or devices that include a combination of hardware and software, which can be attached to a computing system to add functionality to the computing system 800. Examples of peripheral devices include wired and/or wireless network adapters (e.g. network interface cards). Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example in FIG. 8 illustrates a computing system 800 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. In the example shown in FIG. 8, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 800 may include host 810, a root complex 804, a memory subsystem 830, a switch 808, a bridge 814, and a number of peripheral devices. In this example, the peripheral devices include PCIe endpoints 810a-c and legacy endpoints 812a-c. Processors in host 810 may be general purpose computing devices such as are manufactured by Intel®, AMD®, ARM®, Qualcomm®, and others. The processors are generally capable of executing software code. A processor may include multiple processing cores. Host 810 and memory 830 are examples of hosts 110, 410, 510 and memories 130, 430, 530, respectively.

The root complex 804 may be a hardware device or a hardware and software device that connects host 810 and the memory subsystem 830 to the peripheral devices. The peripheral devices may be connected directly to the root complex 804. For example, the PCIe endpoint 810c is connected directly to the root complex 804. Alternatively or additionally, the peripheral devices may be connected to the root complex 804 through a switch 808. A bridge 814 may also be connected to the root complex 804. The root complex 804 may forward transactions to host 810 and direct responses from host 810 back to the peripheral devices. Packet headers 160 and DMA descriptors 170 may be routed to peripheral devices through switch 808 or bridge 814. The root complex 804 may further generate transactions on behalf of host 810, and forward responses to those transactions back to host 810. In some cases, the root complex 804 may also route transactions from one peripheral device to another, and/or between peripheral devices, switches, and bridges. The root complex 804 may provide services for the computer system 800, such as a hot plug controller, a power management controller, an interrupt controller, and/or error detection and reporting. In some implementations, the root complex 804 may be implemented as part of a host system that includes one or more integrated processors and memory.

The memory subsystem 830 may provide temporary or long-term storage for data that may be used by the computing system 800. The memory subsystem 830 may include Dynamic Random Access Memory (DRAM), Synchronous DRAM (SDRAM), and/or Double Data Rate (DDR), among others. In some cases, the memory subsystem 830 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 804 may include a memory controller to manage transactions to and from the memory subsystem 830.

The switch 808 functions as a multi-port connecter between various devices, including the root complex 804, peripheral devices, and possibly other switches and bridges. The switch 808 may route transactions between any of the devices connected to it. For example, the switch 808 may route transactions between the PCIe endpoints 810*a-b* and the legacy endpoint 812*a*, and between the various endpoints 810*a-b*, 812*a* and the root complex 804. The switch 808 may also provide arbitration to prioritize incoming and outgoing transactions. Devices connected to the switch 808 may treat the switch 808 as another requester and/or completer. Though not illustrated here, switches can also be connected to other switches to further expand the number of peripheral devices that can be connected to the computing system 800.

The bridge 814 may provide connectivity to other busses or switching fabrics. The other busses or switching fabrics may implement a PCI variant or another protocol. For example, in the example of FIG. 8, the bridge 814 provides connectivity to a bus implementing the original PCI standard. The bridge 814 may include mechanisms to translate from one bus protocol, such as the original PCI standard, to another protocol, such as PCIe.

Components in the computing system 800 may be connected through a shared bus. For example, in the illustrated example, the legacy endpoints 812*b-c* are connected to a shared PCI bus 816*g*. Alternatively or additionally, peripheral devices may be connected to the computing system 800 in a switching fabric topology. The interconnected devices illustrated in FIG. 8, including the root complex 804, the switch 808, the bridge 814, and the PCIe endpoints 810*a-c*, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 8, the switch 808 is connected to the root complex 804 with Bus 1 816*a* and the PCIe endpoint 810*c* is connected to the root complex with Bus 5 816*e*. Similarly, the bridge 814 is connected to the root complex with Bus 7 816*f*. Each of the PCIe endpoints 810*a-b* and the legacy endpoint 812*a* are also connected to the switch 808*a* with individual busses 816*b-d*. The connections between each of the root complex 804, the switch 808, the bridge 814, the PCIe endpoints 810*a-c* and the legacy endpoint 812*a* are point-to-point because each of the busses 816*a-g* are not shared with another device. Furthermore, a packet directed from one device to another (for example, from the root complex 804 to the PCIe endpoint 810*a*) is routed directly to its destination.

In some implementations, the connections between the devices in the computing system 800 may be numbered. For example, in the illustrated example, the connection between the switch 808 and the root complex 804 is labeled Bus 1 816*a* (Bus 0 may be internal to the root complex 804). Similarly, each of the busses connecting the PCIe endpoints 810*a-b* and the legacy endpoint 812*a* to the switch 808 are labeled Bus 2 816*b*, Bus 3 816*c*, and Bus 4 816*d*, respectively (Bus 2 may be internal to the switch 808). Furthermore, the connection between the root complex 804 and the PCIe endpoint 810*c* may be labeled Bus 5 816*e*, while the connection between the root complex and the bridge 814 may be labeled Bus 6 816*f*. Finally, the shared bus downstream from the bridge 814 may be labeled Bus 8 816*g*. In most cases the numbering of the busses is arbitrary, though bus numbers are generally assigned in a logical fashion. For example, Bus 0 may be located within the root complex 804, and the bus label may increment as the distance between the bus and the root complex 804 increases.

As noted above, peripheral devices may add to and/or modify the functionality of the computing system 800. For example, one PCIe endpoint 810*a* may implement a Wi-Fi adapter 870. Using the Wi-Fi adapter 870, the computing system 800 may be able to communicate wirelessly with a wireless access point 822, and thereby access a network. As another example, another PCIe endpoint 810*b* may implement a video card. A video card may include a port to connect a monitor 824 or other display device. As a further example, the computing system 800 may include a legacy endpoint 812*a* that implements a sound card. A sound card may include a port or jack that accepts a plug for a speaker 826 or other audio output device.

In some cases, a PCIe endpoint may be a multi-function device, that is, a device that provides the services of multiple devices. For example, the PCIe endpoint 810*c* may include an Ethernet adapter, and provide a connection to a gateway device 828, such as a DSL or cable modem. The PCIe endpoint 810*c* may also include a storage adapter, and provide a connection to a storage device 832. The one PCIe endpoint 810*c* thus may provide access to a network 820, as well as access to a storage device 832. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number.

When a computing system such as computing system 800 illustrated in FIG. 8 initially powers up, host 810 may be unaware of any peripheral devices that are connected to the system. Host 810 may be aware of the root complex 804, and possibly also that the root complex 804 is connected to one or more busses. To learn about the rest of the system, host 810 may execute a process to scan and configure the system. This process may be referred to as an enumeration process. The specific process of scanning for, locating, and identifying peripheral devices may be called discovery or discovering. During an enumeration process, software executing on the host 810 may first scan each of the busses 816*a*, 816*e*, 816*f* connected to the root complex 804, and identify the switch 808, the PCIe endpoint 810*c*, and the bridge 814. Upon discovering the switch 808, host 810 may next scan the busses 816*b-d* connected to the switch 808. Host 810 thereby discovers the PCIe endpoints 810*a-c* and the legacy endpoint 812*a*. Upon discovering the bridge 814, host 810 may also scan Bus 8 816*g*; however, the bridge 814 may translate the scanning instructions to the protocol implemented by Bus 8 816*g*.

While scanning the busses, or possibly after, host 810 may also transmit configuration transactions to each of the devices it discovers. Configuration may include, for example, assigning one or more address spaces. For example, PCI devices typically include one or more of a memory address space and/or an I/O address space. Specific registers (e.g. Register 179) of peripheral device memory may be reserved during a configuration transaction in an initialization procedure. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on host 810 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, host 810 may also read information from configuration registers. For example, the PCIe endpoint 810c may include a configuration register that indicates that it has two functions. The PCIe endpoint 810c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 808 and the bridge 814 also include a configuration space with configuration registers. In such implementations, host 810 may discover the switch and bridge functionality by reading configuration registers in the switch 808 and the bridge 814. The switch 808 and the bridge 814 may also be configured by host 810, for example with bus and device numbers.

Figure 9:
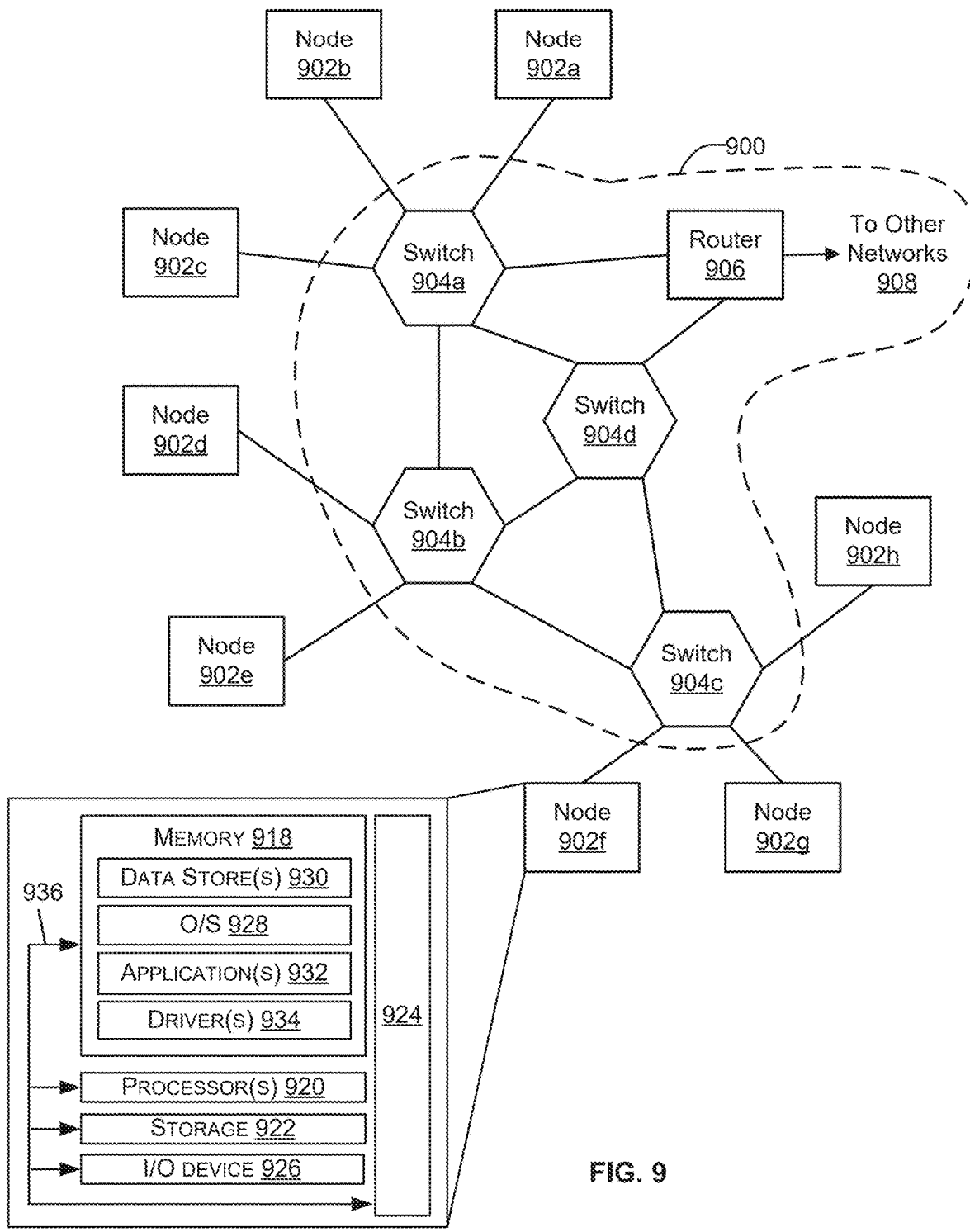
FIG. 9 illustrates a network, illustrating various different types of network devices, such as nodes comprising the network device, switches and routers, according to certain aspects of the disclosure.

FIG. 9 illustrates a network 900, illustrating various different types of network devices, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network. The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A device comprising:
a device memory including a packet descriptor queue; and
detection logic for detecting data segments written to the packet descriptor queue by detecting data sizes of incoming write transactions to the packet descriptor queue;
wherein the device is configured to:
write a first set of data segments to a first entry of the packet descriptor queue, the first set of data segments corresponding to a first DMA descriptor, wherein writing the first set of data segments includes writing a first data segment having a first data size to a first address in the first entry and a second data segment having a second data size to a second address in the first entry;
write a second set of data segments to a second entry of the packet descriptor queue, the second set of data segments corresponding to a second DMA descriptor;
determine, based on a combined size including the first data size and the second data size, that the first DMA descriptor has been completely written to the first entry; and
in response to determining that the first DMA descriptor has been completely written to the first entry, and prior to a completion of writing the second set of data segments, begin processing the first DMA descriptor.

2. The device of claim 1, wherein the device is further configured to:
receive a first set of write transactions from a host, the first set of write transactions including the first set of data segments; and
receive a second set of write transactions from the host, the second set of write transactions including the second set of data segments.

3. The device of claim 1, wherein the first DMA descriptor points to a first packet payload memory location in a host memory, and wherein the second DMA descriptor points to a second packet payload memory location in the host memory.

4. The device of claim 3, wherein processing the first DMA descriptor includes:
accessing the first DMA descriptor from the packet descriptor queue; and
determining the first packet payload memory location from the first DMA descriptor.

5. The device of claim 4, wherein processing the first DMA descriptor further includes:
fetching, by a DMA engine, a packet payload stored in the first packet payload memory location.

6. The device of claim 5, wherein processing the first DMA descriptor further includes:
providing the packet payload to a network interface of the device.

7. The device of claim 3, wherein the device memory further includes a packet header queue, and wherein the device is further configured to:
write a third set of data segments to a first entry of the packet header queue, the third set of data segments corresponding to a first packet header; and
write a fourth set of data segments to a second entry of the packet header queue, the fourth set of data segments corresponding to a second packet header.

8. The device of claim 7, wherein the device is further configured to:
transmit, via a network interface, a network packet that includes the first packet header and a packet payload fetched from the host memory based on the first DMA descriptor.

9. A computer-implemented method comprising:
writing a first set of data segments to a first entry of a packet descriptor queue of a device memory, the first set of data segments corresponding to a first DMA descriptor, wherein writing the first set of data segments includes writing a first data segment having a first data size to a first address in the first entry and a second data segment having a second data size to a second address in the first entry;
writing a second set of data segments to a second entry of the packet descriptor queue, the second set of data segments corresponding to a second DMA descriptor;
detecting, using detection logic, that the first data segment and the second data segment have been written to the first entry of the packet descriptor queue with the first data size and the second data size;
determining, based on a combined size including the first data size and the second data size, that the first DMA descriptor has been completely written to the first entry; and
in response to determining that the first DMA descriptor has been completely written to the first entry, and prior to a completion of writing the second set of data segments, begin processing the first DMA descriptor.

10. The computer-implemented method of claim 9, further comprising:
receiving a first set of write transactions from a host, the first set of write transactions including the first set of data segments; and
receiving a second set of write transactions from the host, the second set of write transactions including the second set of data segments.

11. The computer-implemented method of claim 9, wherein the first DMA descriptor points to a first packet payload memory location in a host memory, and wherein the second DMA descriptor points to a second packet payload memory location in the host memory.

12. The computer-implemented method of claim 11, wherein processing the first DMA descriptor includes:
accessing the first DMA descriptor from the packet descriptor queue; and
determining the first packet payload memory location from the first DMA descriptor.

13. The computer-implemented method of claim 12, wherein processing the first DMA descriptor further includes:
fetching, by a DMA engine, a packet payload stored in the first packet payload memory location.

14. The computer-implemented method of claim 13, wherein processing the first DMA descriptor further includes:
providing the packet payload to a network interface.

15. The computer-implemented method of claim 11, wherein the device memory further includes a packet header queue, and wherein the computer-implemented method further comprises:
writing a third set of data segments to a first entry of the packet header queue, the third set of data segments corresponding to a first packet header; and
writing a fourth set of data segments to a second entry of the packet header queue, the fourth set of data segments corresponding to a second packet header.

16. A non-transitory computer-readable medium comprising instructions that, when executed by a processor, cause the processor to perform operations comprising:
write a first set of data segments to a first entry of a packet descriptor queue of a device memory, the first set of data segments corresponding to a first DMA descriptor, wherein writing the first set of data segments includes writing a first data segment having a first data size to a first address in the first entry and a second data segment having a second data size to a second address in the first entry;
writing a second set of data segments to a second entry of the packet descriptor queue, the second set of data segments corresponding to a second DMA descriptor;

detecting, using detection logic, that the first data segment and the second data segment have been written to the first entry of the packet descriptor queue with the first data size and the second data size; and in response to determining that the first DMA descriptor has been completely written to the first entry, and prior to a completion of writing the second set of data segments, begin processing the first DMA descriptor.

17. The non-transitory computer-readable medium of claim 16, wherein the operations further comprise:

receiving a first set of write transactions from a host, the first set of write transactions including the first set of data segments; and receiving a second set of write transactions from the host, the second set of write transactions including the second set of data segments.

18. The non-transitory computer-readable medium of claim 16, wherein the first DMA descriptor points to a first packet payload memory location in a host memory, and wherein the second DMA descriptor points to a second packet payload memory location in the host memory.

19. The non-transitory computer-readable medium of claim 18, wherein processing the first DMA descriptor includes:

accessing the first DMA descriptor from the packet descriptor queue; and determining the first packet payload memory location from the first DMA descriptor.

20. The non-transitory computer-readable medium of claim 19, wherein processing the first DMA descriptor further includes:

fetching, by a DMA engine, a packet payload stored in the first packet payload memory location; and providing the packet payload to a network interface.

* * * * *